United States Patent [19]

Williams et al.

[11] 4,135,769

[45] Jan. 23, 1979

[54] ANTI-SKID SYSTEM INCORPORATING MEANS FOR CONTROLLING THE RATE OF RE-APPLICATION OF BRAKE PRESSURE

[75] Inventors: Geoffrey A. Williams, Coventry; Keith R. Green, Astley, both of England

[73] Assignee: Dunlop Limited, London, England

[21] Appl. No.: 827,240

[22] Filed: Aug. 24, 1977

[30] Foreign Application Priority Data

Sep. 3, 1976 [GB] United Kingdom ............... 36564/76

[51] Int. Cl.² .............................................. B60T 8/02
[52] U.S. Cl. .................................... 303/106; 244/111; 303/110
[58] Field of Search ........................ 188/181; 244/111; 303/20, 93, 97, 103, 105–107, 109–111; 340/53, 62; 361/238; 364/426

[56] References Cited

U.S. PATENT DOCUMENTS

| 3,017,145 | 1/1962 | Yarber | 244/111 |
|---|---|---|---|
| 3,398,995 | 8/1968 | Martin | 303/20 X |
| 3,674,318 | 7/1972 | Hickner et al. | 303/100 |
| 3,768,873 | 10/1973 | Hirzel | 303/109 |
| 3,857,613 | 12/1974 | Arikawa | 303/109 |
| 3,880,475 | 4/1975 | Booher | 303/106 |
| 3,888,550 | 6/1975 | Reinecke et al. | 303/103 |
| 3,917,356 | 11/1975 | DeVlieg | 303/93 |
| 3,922,022 | 11/1975 | Ochiai | 303/106 |
| 3,966,267 | 6/1976 | McNinch, Jr. et al. | 303/106 |
| 4,007,970 | 2/1977 | Romero | 303/93 |

FOREIGN PATENT DOCUMENTS

| 704925 | 3/1954 | United Kingdom | 244/111 |
|---|---|---|---|
| 1427203 | 3/1976 | United Kingdom | 303/93 |
| 1428223 | 3/1976 | United Kingdom | 303/115 |

Primary Examiner—Stephen G. Kunin
Attorney, Agent, or Firm—Stevens, Davis, Miller & Mosher

[57] ABSTRACT

A vehicle anti-skid system in which the rate of re-application of brake pressure following a skid-correcting operation is controlled so that if after a predetermined time no skid has occurred the rate of re-application of brake pressure increases progressively with time.

9 Claims, 2 Drawing Figures

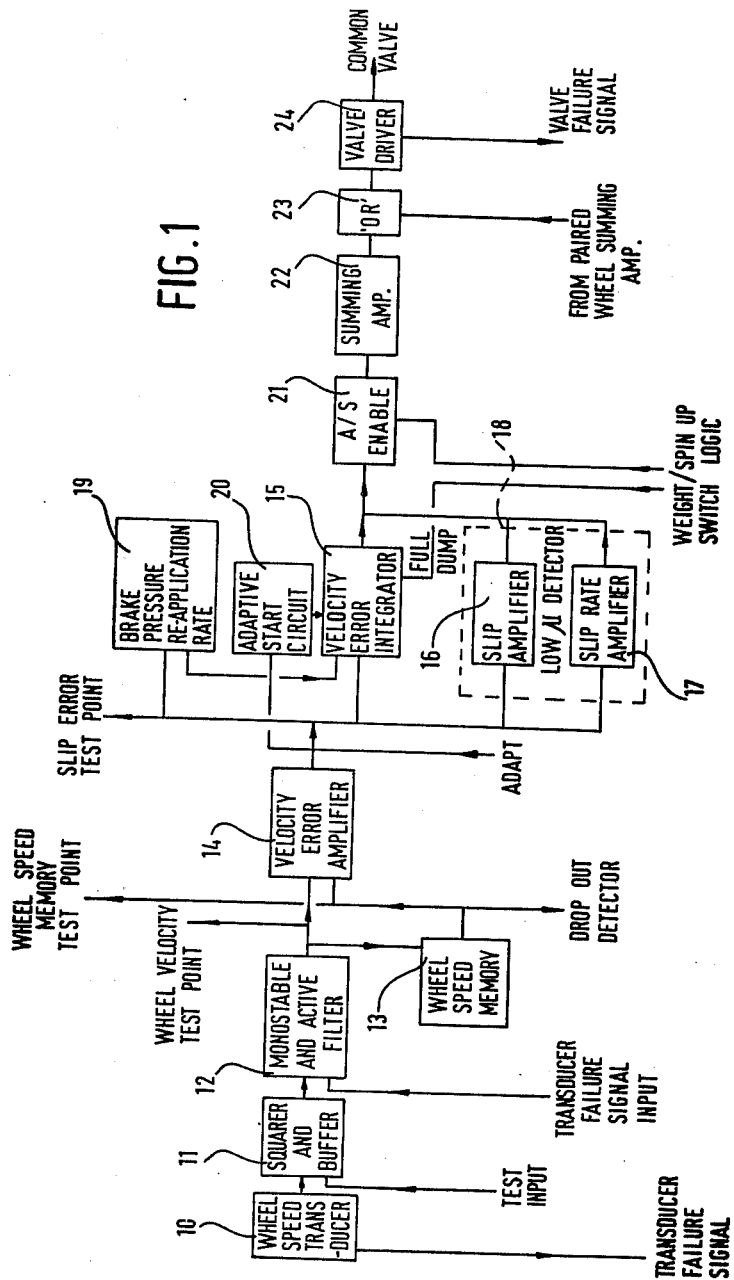

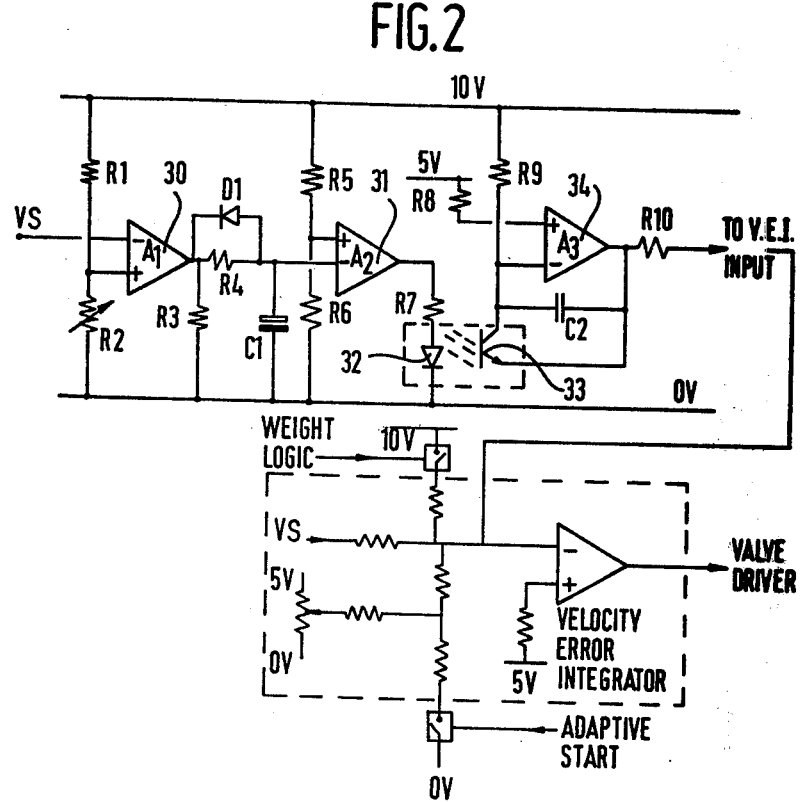

ANTI-SKID SYSTEM INCORPORATING MEANS FOR CONTROLLING THE RATE OF RE-APPLICATION OF BRAKE PRESSURE

This invention relates to vehicle anti-skid systems and particularly to anti-skid systems for aircraft landing wheels.

In an aircraft anti-skid system means is provided to sense the rate of deceleration of a wheel, and to actuate brake-releasing means whenever the rate at which the wheel is being slowed down by its brake exceeds a predetermined value which indicates the commencement of wheel locking. By avoiding the locking of the wheel, important objectives can be met including a reduction in tire wear, avoidance of directional instability, and a reduction in the distance required for braking.

The last-mentioned objective can be difficult to meet in certain circumstances, particularly when the tire/runway friction is variable from place to place as the result of, for example, pools of water or patches of frost. If an aircraft in its landing run crosses an area having a low coefficient of friction, the brakes are released to avoid wheel locking, and may not be able to take full advantage of areas of relatively high friction which are crossed subsequently.

According to the invention, an anti-skid system for a vehicle wheel brake comprises sensing means for sensing excessive wheel deceleration, brake-releasing means responsive to said sensing means, means for initiating re-application of the brake after a brake releasing operation, and control means for controlling the rate of re-application of brake pressure so that after a predetermined time the rate of re-application increases progressively with time.

The sensing means may take various forms. For example, a direct measurement may be made of the wheel deceleration rate; alternatively the "slip" of the wheel may be measured relative to the aircraft speed obtained from an unbraked datum wheel, or relative to a simulated aircraft speed measurement generated by reference to the initial landing speed and the time from touch-down, assuming a maximum-braked landing run with conditions rather better than the best conditions actually obtained in practice. The simulated speed is normally related automatically to actual aircraft speed after each wheel speed recovery operation of the system.

In a preferred example, the skid-sensing means is of the latter type, feeding a "quasi-slip" signal into the anti-skid control means. In a control system of this kind, it is possible to control the pressure level to which the brakes are released in accordance with various factors including the rate at which the actual wheel speed is falling at the commencement of the brake-releasing cycle, and the duration of the period which elapses before the quasi-slip signal disappears.

All of the above factors may be employed to determine the time at which the brake begins to be re-applied, and the rate of rise of pressure in the brake following its initial re-application. The present invention, however, also provides means for causing the rate of re-application of brake pressure to be controlled so as to take advantage rapidly of any improvement in friction coefficient which may occur following the initial release of the brake.

One embodiment of the invention will now be described, by way of example, with reference to the accompanying drawings, in which:

FIG. 1 is a block diagram of an aircraft anti-skid system, and

FIG. 2 is a circuit diagram of a brake pressure re-application rate circuit, forming part of the system of FIG. 1.

As illustrated in FIG. 1, the system incorporates a wheel speed transducer 10 of conventional form, which provides an AC signal of frequency proportional to the speed of rotation of the braked wheel. The output from the transducer is passed to a squarer and buffer stage 11 which actuates a circuit 12 which includes a monostable circuit to produce a series of pulses of fixed size and duration from the squared signal from circuit 11, the pulses being passed through a filter stage in circuit 12 to produce an integrated voltage proportionate to wheel speed.

The wheel speed signal from circuit 12 is passed to a wheel speed memory circuit 13 which generates a signal decaying with time at an "ideal" rate to simulate the actual aircraft ground speed, and the actual and simulated signals are then both passed to a velocity error amplifier 14 in which their difference is measured to provide a "quasi slip" signal.

The quasi slip signal from circuit 14 is then passed to three units comprising a velocity error integrator 15, a slip amplifier 16 and slip rate amplifier 17 which together form a low friction detector 18, and a brake pressure re-application rate circuit 19.

The slip amplifier 16 takes the quasi slip signal, and, after it has increased to a predetermined threshold value, amplifies it by a known ratio.

The slip rate amplifier 17 takes the same quasi slip signal but, after the threshold value has been reached gives an output proportional to its rate of change. The amplifiers 16 and 17 are incorporated in an operational amplifier to form the low friction detector circuit 18, which has a gain which increases to a higher level after a certain level of slip signal input and/or rates of change of slip signal input has arisen, thus giving a more drastic reaction (i.e. a faster drop in brake pressure) to a large slip occurring as the aircraft moves from a high-friction to a low-friction area.

The velocity error integrator circuit 15 integrates the quasi slip signal to give a desired level for brake pressure re-application after the skid has been corrected. The level of pressure for re-application is reduced to a greater extent by this circuit if the velocity error is relatively larger and/or persists for a relatively long time.

The brake pressure re-application rate circuit 19 is provided to enable the system to accommodate changes in runway friction from "low" to "high" — for example after crossing a partly flooded area to a dry surface.

The function of circuit 19 is to vary the "aiming potential" of the velocity error integrator 15 in a non-linear manner with time. Zero slip is detected and if the time during which no slip is present exceeds a predetermined limit (e.g. 0.25 of a second) then a further integrated signal is passed to the velocity error integrator, so raising its "aiming potential" approximately proportionately to the square of the further time elapsing after the 0.25 second delay. The effect of this is to cause a more rapid brake re-application rate as will be described later in the specification.

An adaptive start circuit 20 is provided to feed an artificial slip signal into the velocity error integrator, when actuated by a weight switch or wheel spin-up signal on touchdown. This effectively dumps brake pressure prior to touchdown and initially applies brake pressure, after wheel spin-up and/or weight switch operation, at a faster rate than during normal skid control operation.

A solid-state switch unit 21 is provided in series with the output from the circuits 15 and 18, operated by the spin-up signal or weight signal on touchdown. Following the unit 21, the output signal is passed through a summing amplifier 22 and an "OR" gate 23 which also accepts the output from a similar system controlling a wheel on the opposite side of the aircraft.

The output from the OR gate is then passed to a valve driver circuit 24 which operates a common brake-release proportional control valve for the paired wheels.

As illustrated in FIG. 2, the brake pressure re-application rate circuit 19 is fed from the circuit 14 with a voltage Vs corresponding to the quasi-slip signal. This is fed to a comparator 30 which responds to near-zero level of slip which causes Vs to go to a low level, causing the output of the comparator 30 to rise to a high level, charging capacitor C1 through R4. A second comparator 31 has a threshold set by the potential at the junction of R5 and R6 corresponding to the voltage achieved after a delay of 0.25 of a second due to the time constant of the charging circuit for C1. When the voltage across C1 reaches this value the output from comparator 31 drops to a low level, reduction in the current through R7 and the associated photo-emissive diode 32 causing photo-transistor 33 to stop conducting. The diode 32 and photo-transistor 33 constitute a solid-state switch which upon operation as described above removes an effective short-circuit from across capacitor C2 which forms part of a brake pressure rate increasing circuit C2, R9, 34, R8 allowing it to charge towards the 10 volt supply. The solid state switch provides complete electrical isolation between the comparator 31 and the brake pressure rate increasing circuit: as a consequence, the charging and discharging of C2 is held to a square law characteristic.

The voltage input to integrator 34 thus rises above the 5 volt level and its output reduces at a rate determined by R9C2 and the gain of integrator 34.

The reducing output from integrator 34 reduces the input to the velocity error integrator 15, increasing its output and thus, via the inversion in the summing amplifier, reducing the valve drive output and thereby increasing the brake pressure more rapidly. The effect is of integrator 34 feeding integrator 15 to provide an output falling proportionally to the square of the time elapsing after the 0.25 second delay, thus providing a brake pressure increasing with the square of the same time.

When slip occurs again, comparator 30 changes state and C1 discharges rapidly through D1 and the output stage of comparator 30 falls to zero volts. Consequently comparator 31 changes state, causing current to flow through diode 32 which in turn causes conduction of photo transistor 33: this causes integrator 34 to revert to its "voltage follower" mode, returning its output to the 5-volt level, thus re-setting the circuit to its normal state.

The system described above has the advantage that the rapid brake re-application rate provided after a ¼-second delay on crossing from a low- to a high-friction surface enables the optimum use to be made of the available friction and thus reduces the length of runway needed to bring the aircraft to rest.

In the example described above the anti-skid system relates to the control of brake pressure for a single wheel, taking its wheel speed signal from that wheel. In a multiple-wheel aircraft undercarriage it is possible to provide an anti-skid system as described for each wheel independently of all other wheels or the wheel speed signals from pairs or groups of wheels may be combined together to provide a simulation of aircraft velocity (on the assumption that the highest wheel speed at any time is a true measure of aircraft speed). The difference of any particular wheel speed from that highest speed represents a skidding condition and is used as described above to provide a velocity error signal.

Having now described our invention, what we claim is:

1. An anti-skid system for a vehicle wheel brake comprising sensing means for sensing excessive wheel deceleration, brake-releasing means responsive to said sensing means, means for initiating re-application of the brake after a brake-releasing operation, and control means for controlling the rate of re-application of brake pressure so that after a predetermined time during which the brake pressure is re-applied at a relatively low rate, the rate of re-application increases progressively with time.

2. An anti-skid system according to claim 1 wherein the said rate of re-application after a predetermined time increases with the square of the subsequent time.

3. An anti-skid system according to claim 1 wherein the skid-sensing means is of the kind which compares the speed of the braked wheel with a simulated vehicle speed signal.

4. An anti-skid system according to claim 1 comprising a low friction detector circuit to provide a greater drop in brake pressure when the level of slip and/or the rate of change of slip is greater than a predetermined amount.

5. An anti-skid system according to claim 1 comprising a velocity error integrator circuit which acts to reduce the level of pressure for re-application of the brake to a greater extent if the velocity error is relatively large or persists for a relatively longer time.

6. An anti-skid system according to claim 1 comprising an adaptive start circuit responsive to a wheel spin-up signal or weight switch and arranged to dump brake pressure prior to touchdown and to apply brake pressure after wheel spin-up or weight switch operation initially at a faster rate than during normal skid control operation.

7. An anti-skid system according to claim 1 wherein the said control means comprises a solid state switch and a brake pressure re-application rate increasing circuit, the solid state switch being arranged to isolate the brake pressure rate increasing circuit so as to ensure that the brake pressure increases with the square of the time elapsing after operation of the solid state switch.

8. An anti-skid system according to claim 7 wherein the solid state switch is arranged to be actuated whenever the wheel slip falls below a predetermined level, the output from the velocity error circuit being fed to a comparator which charges a capacitor until it reaches a voltage level set in a second comparator which is arranged to operate the solid state switch after a predetermined time depending on the time constant of the charging circuit for the capacitor.

9. A braking system for a vehicle comprising a brake associated with the vehicle and an anti-skid system comprising sensing means operating to compare the speed of the braked wheel with a simulated vehicle speed signal to provide a quasi-slip signal, brake-releasing means responsive to an excessive quasi-slip signal to release the brake, means for initiating re-application of the brake after a brake-releasing operation, and control means for controlling the rate of re-application of brake pressure so that after a predetermined time during which the brake pressure is re-applied at a relatively low rate the rate of re-application increases progressively with time.

* * * * *